United States Patent
Watsen

(10) Patent No.: US 9,600,302 B2
(45) Date of Patent: Mar. 21, 2017

(54) USING A PUBLIC KEY INFRASTRUCTURE FOR AUTOMATIC DEVICE CONFIGURATION

(71) Applicant: Juniper Networks, Inc., Sunnyvale, CA (US)

(72) Inventor: Kent A. Watsen, Leesburg, VA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 14/626,382

(22) Filed: Feb. 19, 2015

(65) Prior Publication Data

US 2016/0246617 A1    Aug. 25, 2016

(51) Int. Cl.
H04L 29/06 (2006.01)
G06F 9/445 (2006.01)
H04L 9/32 (2006.01)
H04L 12/24 (2006.01)

(52) U.S. Cl.
CPC ........ *G06F 9/44505* (2013.01); *H04L 9/3247* (2013.01); *H04L 9/3268* (2013.01); *H04L 41/0803* (2013.01); *H04L 41/0886* (2013.01); *H04L 63/0823* (2013.01); *H04L 63/12* (2013.01)

(58) Field of Classification Search
CPC ... H04L 63/061; H04L 63/08; H04L 63/0823; H04L 63/20; H04L 9/3213; H04L 9/3247
USPC ....................................................... 713/156
See application file for complete search history.

(56) References Cited

U.S. PATENT DOCUMENTS

| | | | |
|---|---|---|---|
| 8,145,917 B2 * | 3/2012 | Waris | G06F 21/575 713/187 |
| 2008/0025515 A1 | 1/2008 | Coombs | |
| 2009/0287837 A1 * | 11/2009 | Felsher | G06F 19/322 709/229 |
| 2010/0317420 A1 * | 12/2010 | Hoffberg | G06Q 30/0207 463/1 |
| 2013/0318343 A1 * | 11/2013 | Bjarnason | H04L 41/0809 713/157 |

OTHER PUBLICATIONS

Extended European Search report corresponding to EP 15 18 7079, mailed Feb. 8, 2016, 10 pages.

(Continued)

*Primary Examiner* — Samson Lemma
(74) *Attorney, Agent, or Firm* — Harrity & Harrity, LLP

(57) ABSTRACT

A device may receive a digital voucher, a customer certificate, and configuration information for automatically configuring the device. The digital voucher may include a first customer identifier that identifies a customer associated with the device and a device identifier that identifies the device. The customer certificate may include a second customer identifier that identifies the customer and a customer public key associated with the customer. The configuration information may include information that identifies a configuration for automatically configuring the device. The device may validate at least one of the digital voucher, the customer certificate, or the configuration information. The device may configure the device, using the configuration, based on validating at least one of the digital voucher, the customer certificate, or the configuration information.

20 Claims, 13 Drawing Sheets

(56) References Cited

OTHER PUBLICATIONS

Pritikin et al., "Bootstrapping Key Infrastructures; draft-pritikin-anima-bootstrapping-keyinfra-01", Internet Engineering Task Force, Feb. 13, 2015, 23 pages.
Watsen et al., "Zero Touch Provisioning for NETCONF Call Home (ZeroTouch)," Internet Engineering Task Force (IETF), https://tools.ietf.org/html/draft-ietf-netconf-zerotouch-01, Oct. 27, 2014, 37 pages.
Pritikin et al., "Bootstrapping Key Infrastructures," Internet Engineering Task Force (IETF), https://tools.ietf.org/html/draft-pritikin-anima-bootstrapping-keyinfra-00, Nov. 3, 2014, 20 pages.
Watsen et al., "Zero Touch Provisioning for NETCONF Call Home (ZeroTouch)," Internet Engineering Task Force (IETF), https://tools.ietf.org/html/draft-kwatsen-netconf-zerotouch-00, Nov. 2013, 10 pages.

\* cited by examiner

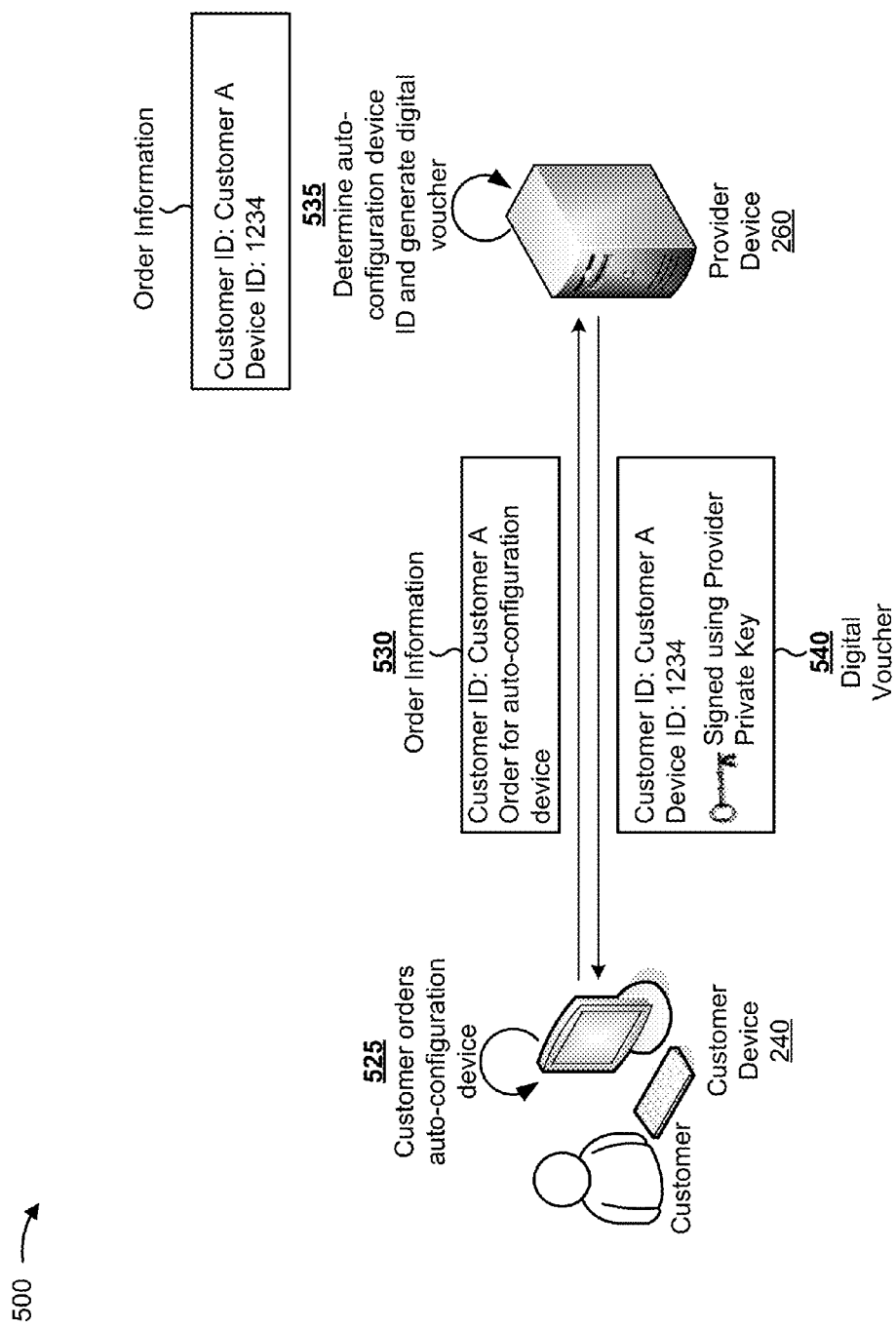

USING A PUBLIC KEY INFRASTRUCTURE FOR AUTOMATIC DEVICE CONFIGURATION

BACKGROUND

A public key infrastructure (PKI) is a set of hardware, software, people, policies, and procedures needed to create, manage, distribute, use, store, and revoke digital certificates. In cryptography, a PKI is an arrangement that binds public keys with respective user identities by means of a certificate authority (CA). The user identity must be unique within each CA domain. A third-party validation authority (VA) can provide this information on behalf of the CA. The binding is established through a registration and issuance process, which, depending on the assurance level of the binding, may be carried out by software at a CA or under human supervision. The PKI role that assures this binding is called the registration authority (RA), which ensures that the public key is bound to the individual to which the public key is assigned. PKI enables users to securely communicate on an insecure public network, and reliably verify the identity of a user via digital signatures.

SUMMARY

According to some possible implementations, a device may initiate an automatic device configuration process to automatically configure the device. The device may receive, based on initiating the automatic device configuration process, a digital voucher, a customer certificate, and configuration information. The digital voucher may include a first customer identifier that identifies a customer associated with the device and a device identifier that identifies the device. The customer certificate may include a second customer identifier that identifies the customer and a customer public key associated with the customer. The configuration information may include information that identifies a configuration for automatically configuring the device. The device may validate at least one of the digital voucher, the customer certificate, or the configuration information. The device may configure the device, using the configuration, based on validating at least one of the digital voucher, the customer certificate, or the configuration information.

According to some possible implementations, a computer-readable medium may store instructions that, when executed by a processor, cause the processor to receive a digital voucher, a customer certificate, and configuration information for automatically configuring the device. The digital voucher may include a first customer identifier that identifies a customer associated with the device and a device identifier that identifies the device. The customer certificate may include a second customer identifier that identifies the customer and a customer public key associated with the customer. The configuration information may include information that identifies a configuration for automatically configuring the device. The instructions may cause the processor to validate at least one of the digital voucher, the customer certificate, or the configuration information. The instructions may cause the device to configure the device, using the configuration, based on validating at least one of the digital voucher, the customer certificate, or the configuration information.

According to some possible implementations, a method may include initiating, by a device, an automatic device configuration process to automatically configure the device. The method may include receiving, by the device and based on initiating the automatic device configuration process, a digital voucher, a customer certificate, and configuration information. The digital voucher may include a first customer identifier that identifies a customer associated with the device and a device identifier that identifies the device. The customer certificate may include a second customer identifier that identifies the customer and a first public key associated with the customer. The configuration information may include information that identifies a configuration for automatically configuring the device. The method may include performing, by the device, a validation operation using at least one of the digital voucher, the customer certificate, or the configuration information. The method may include configuring, by the device and based on performing the validation operation, the device using the configuration.

BRIEF DESCRIPTION OF THE DRAWINGS

FIGS. 5A and 5B are diagrams of an example implementation relating to the example process shown in FIG. 4;

DETAILED DESCRIPTION

The following detailed description of example implementations refers to the accompanying drawings. The same reference numbers in different drawings may identify the same or similar elements.

A customer of a provider that provides network devices may have difficulty configuring the network devices (e.g., to communicate over a network, to interoperate with other devices of the customer, to enforce or comply with security requirements, etc.). Thus, the customer may want a network device that is simple to configure. Implementations described herein provide such simplicity via an automatic device configuration process (e.g., a "zero touch" configuration process) whereby the network device can be automatically configured simply by connecting the network device to a network. Furthermore, implementations described herein provide such automatic configuration in a secure manner to prevent the network device from being maliciously or incorrectly configured.

Figure 1:
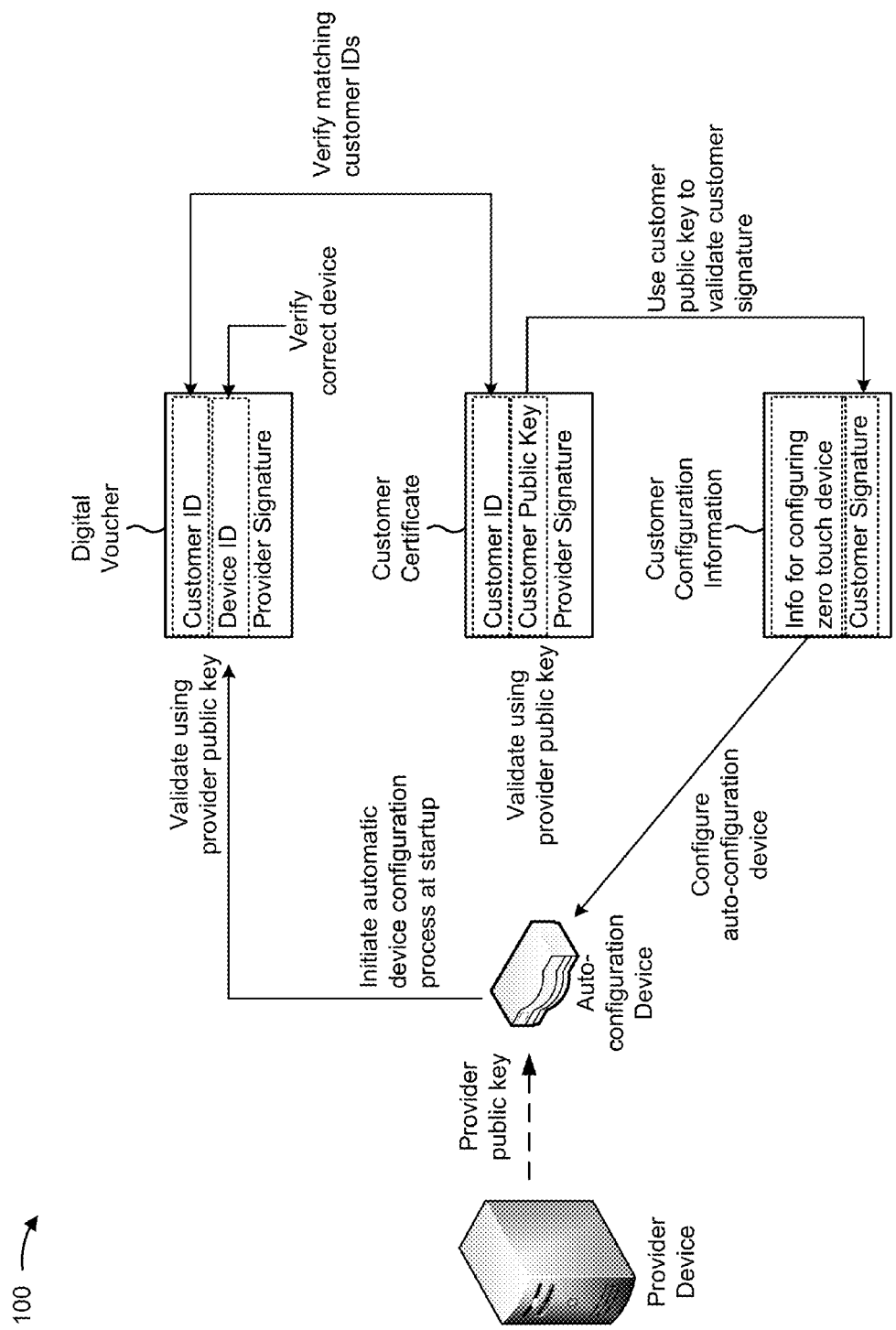
FIG. 1 is a diagram of an overview of an example implementation described herein.

FIG. 1 is a diagram of an overview of an example implementation 100 described herein. As shown in FIG. 1, an auto-configuration device (e.g., a network device) may initiate an automatic device configuration process at startup so that the auto-configuration device may be automatically configured with an appropriate customer configuration. For example, a customer may connect the auto-configuration device to a power source and a network, and the auto-configuration device may detect that the auto-configuration device is currently configured with a default configuration (e.g., a factory setting). Based on detecting the default configuration, the auto-configuration device may initiate an automatic device configuration process.

As further shown in FIG. 1, the auto-configuration device may perform the automatic device configuration process using a digital voucher, a customer certificate, and customer configuration information, which are described in more detail elsewhere herein. The digital voucher, the customer certificate, and the customer configuration information are used to increase security of the automatic device configuration process.

As shown, the auto-configuration device may validate the digital voucher, such as by using a provider public key (e.g., received from a provider device, such as a server) to verify the provider device that generated a provider signature attached to the digital voucher, and by verifying that a device identifier included in the digital voucher matches a device identifier of the auto-configuration device. As further shown, the auto-configuration device may validate the customer certificate, such as by using the provider public key to verify the provider device that generated the provider signature attached to the customer certificate, and by verifying that a customer identifier included in the customer certificate matches a customer identifier included in the digital voucher. Finally, the auto-configuration device may validate the customer configuration information, such as by using a customer public key, included in the customer certificate, to verify a customer device that generated a customer signature attached to the customer configuration information. After successful validation of the digital voucher, the customer certificate, and the customer configuration information, the auto-configuration device may use a configuration, included in the customer configuration information, to automatically configure the auto-configuration device.

In this way, the auto-configuration device may automatically configure itself with customer configuration information, thereby simplifying a configuration process for the customer. Furthermore, by performing the validations described herein, the auto-configuration device may ensure that the customer configuration information is valid and correct, thereby providing security of the automatic device configuration process.

Figure 2:
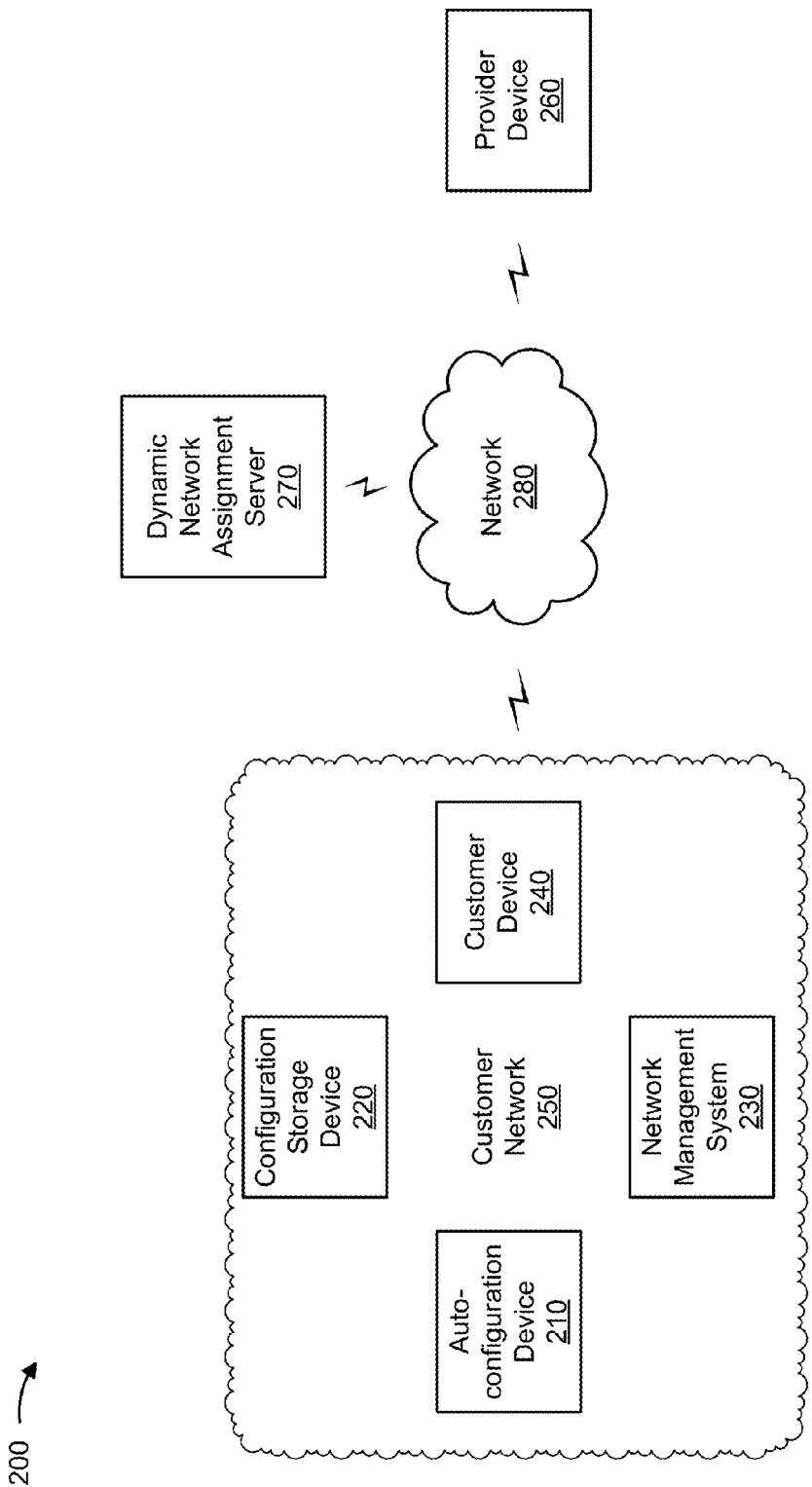
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include an auto-configuration device 210, a configuration storage device 220, a network management system 230, a customer device 240, a customer network 250, a provider device 260, a dynamic network assignment server 270, and a network 280. Devices of environment 200 may interconnect via wired connections, wireless connections, or a combination of wired and wireless connections.

Auto-configuration device 210 may include one or more configurable network devices provided by a device provider to a customer of the device provider. Auto-configuration device 210 may include any device capable of connecting to a network and identifying configuration information for self-configuration (e.g., automatic configuration). For example, auto-configuration device 210 may include a router, a switch, a hub, a firewall, a gateway, a bridge, a server, a mobile phone, a desktop computer, a laptop computer, or a similar type of device. Auto-configuration device 210 may interact with one or more devices of environment 200 to perform an automatic device configuration process, as described in more detail elsewhere herein.

Configuration storage device 220 may include one or more devices capable of receiving, generating, storing, processing, and/or providing configuration information (e.g., customer configuration information). For example, configuration storage device 220 may include a server (e.g., a configuration server) or a similar type of device. In some implementations, a customer may input configuration information to configuration storage device 220 (e.g., via customer device 240), and auto-configuration device 210 may access the configuration information to perform an automatic device configuration process. Additionally, or alternatively, the customer may provide (e.g., via customer device 240) a digital voucher and/or a customer certificate to configuration storage device 220, and auto-configuration device 210 may access the digital voucher and/or the customer certificate to assist in securely performing the automatic device configuration process.

Network management system 230 may include one or more devices that assist auto-configuration device 210 in performing an automatic device configuration process. For example, network management system 230 may include one or more servers (e.g., backend server(s), cloud computing server(s), distributed server(s), etc.) or the like. In some implementations, network management system 230 may be used by a customer to assist in managing customer network 250. Additionally, or alternatively, auto-configuration device 210 may access network management system 230 for various information described herein (e.g., a provider public key and/or other information).

Customer device 240 may include one or more devices used by a customer to access customer network 250, network 280, and/or one or more devices shown in environment 200. For example, customer device 240 may include a computing device, such as a desktop computer, a laptop computer, a tablet computer, a mobile phone, or a similar type of device. In some implementations, a customer may use customer device 240 to provide information to and/or receive information from one or more devices of environment 200, such as configuration storage device 220, network management system 230, and/or provider device 260. The information may assist auto-configuration device 210 with performing an automatic device configuration process.

Customer network 250 may include one or more wired and/or wireless networks associated with a customer. For example, customer network 250 may include a local area network (LAN), a wide area network (WAN), a private network, an intranet, a cellular network, a public land mobile network (PLMN), a metropolitan area network (MAN), a telephone network (e.g., the Public Switched Telephone Network (PSTN)), an ad hoc network, the Internet, a fiber optic-based network, a cloud computing network, or the like, and/or a combination of these or other types of networks. In some implementations, auto-configuration device 210 may automatically configure itself to interoperate with other devices of customer network 250 (e.g., on a private network, an intranet, etc.).

Provider device 260 may include one or more devices associated with a provider that provides (e.g., sells, deploys, provisions, ships, etc.) auto-configuration device 210 to a customer of the provider. The provider may use provider device 260 to interact (e.g., with or without the provider's input) with one or more other devices of environment 200. For example, provider device 260 may include a server (e.g., a web server, a host server, a storage server, etc.), a desktop computer, a laptop computer, or a similar type of device. In some implementations, provider device 260 may provide information to and/or receive information from customer device 240 and/or network management system 230. The information may assist auto-configuration device 210 with performing an automatic device configuration process.

Dynamic network assignment server 270 may include one or more devices that provide dynamic network address assignment to one or more devices of environment 200, such as auto-configuration device 210. For example, dynamic network assignment server 270 may include a server, such as a dynamic host configuration protocol (DHCP) server, or a similar type of device. In some implementations, dynamic network assignment server 270 may be under administrative control of the customer, and may be local to customer network 250. In some implementations, dynamic network assignment server 270 may not be under administrative control of the customer, and may be accessible via a network external to customer network 250 (e.g., network 280). Auto-configuration device 210 may interact with dynamic network assignment server 270 (e.g., via customer network 250 and/or network 270) for dynamic address assignment, and/or to receive information that identifies a configuration storage device 220 to be accessed by auto-configuration device 210 to perform an automatic device configuration process.

Network 280 may include one or more wired and/or wireless networks. For example, network 280 may include a cellular network, a PLMN, a LAN, a WAN, a MAN, a telephone network (e.g., the PSTN), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
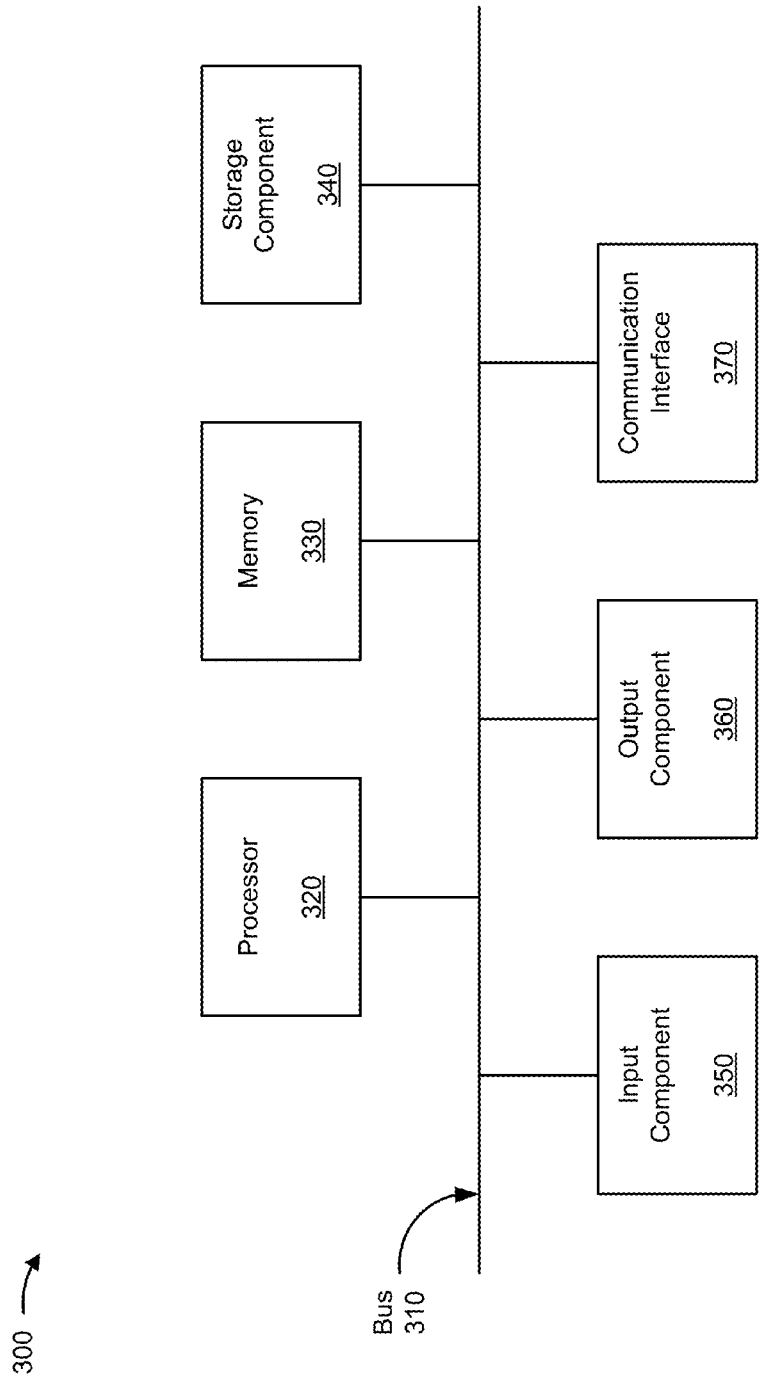
FIG. 3 is a diagram of example components of one or more devices of FIG. 2.

FIG. 3 is a diagram of example components of a device 300. Device 300 may correspond to auto-configuration device 210, configuration storage device 220, network management system 230, customer device 240, provider device 260, and/or dynamic network assignment server 270. In some implementations, auto-configuration device 210, configuration storage device 220, network management system 230, customer device 240, provider device 260, and/or dynamic network assignment server 270 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
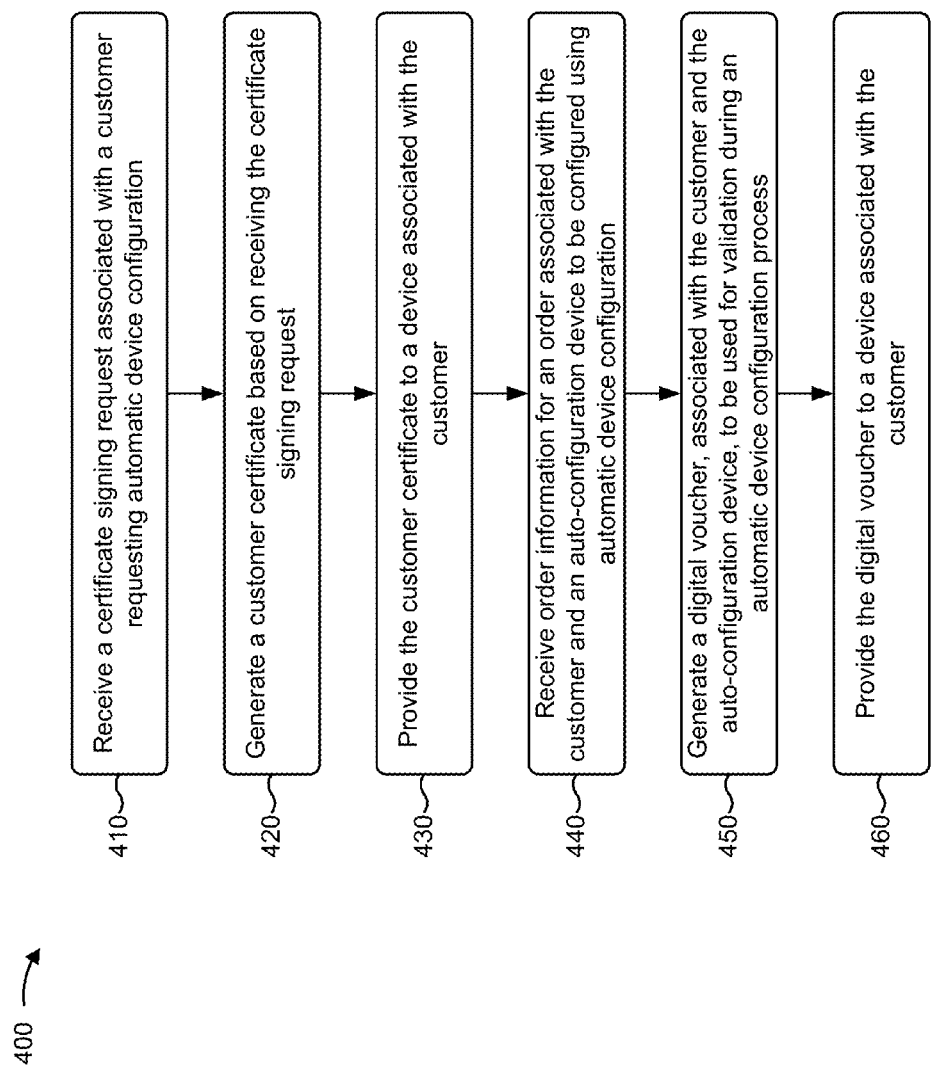
FIG. 4 is a flow chart of an example process for generating a digital voucher to be used for validation during an automatic device configuration process.

FIG. 4 is a flow chart of an example process 400 for generating a digital voucher to be used for validation during an automatic device configuration process. In some implementations, one or more process blocks of FIG. 4 may be performed by provider device 260. In some implementations, one or more process blocks of FIG. 4 may be performed by another device or a set of devices separate from or including provider device 260, such as auto-configuration device 210, configuration storage device 220, network management system 230, customer device 240, and/or dynamic network assignment server 270.

As shown in FIG. 4, process 400 may include receiving a certificate signing request associated with a customer requesting automatic device configuration (block 410). For example, provider device 260 may receive a certificate signing request from customer device 240. In some implementations, a customer may want to purchase and/or deploy auto-configuration device 210. To set up the auto-configuration process, the customer may interact with customer device 240 to generate and/or receive a customer public/private key pair (e.g., a customer public key and a corresponding customer private key). The customer may interact with customer device 240 to provide the customer public key and a customer identifier, that identifies the customer (e.g., a customer name, a customer address, a customer account number, etc.), to provider device 260.

For example, customer device 240 may provide a certificate signing request to provider device 260. The certificate signing request may include the customer identifier and the customer public key. In some implementations, the customer identifier may be signed using the customer private key. Provider device 260 may receive the certificate signing request, including the customer identifier and the customer public key, from customer device 240. In some implementations, the certificate signing request may include other information in addition to the customer identifier and the public key.

As further shown in FIG. 4, process 400 may include generating a customer certificate based on receiving the certificate signing request (block 420), and providing the customer certificate to a device associated with the customer (block 430). For example, provider device 260 may use the certificate signing request (and/or information included in the certificate signing request) to generate a customer certificate. The customer certificate may be signed using a provider private key associated with the provider. In some implementations, provider device 260 may sign the certificate signing request, using the provider private key, to generate the customer certificate. The customer certificate may include the customer identifier, the customer public key, and a digital signature generated using the provider public key. Provider device 260 may provide the customer certificate to customer device 240. In some implementations, provider device 260 may sign the certificate signing request to prevent a malicious user from faking the certificate signing request.

As further shown in FIG. 4, process 400 may include receiving order information for an order associated with the customer and an auto-configuration device to be configured using automatic device configuration (block 440). For example, provider device 260 may receive order information from customer device 240. The order information may be associated with a customer order for one or more auto-configuration devices 210. As an example, a customer may order (e.g., may purchase) auto-configuration device 210, and provider device 260 may receive order information associated with the order (e.g., from customer device 240, from a device that manages sales of auto-configuration devices 210, etc.).

In some implementations, the order information may include a customer identifier that identifies a customer that ordered auto-configuration device 210. Additionally, or alternatively, the order information may include an indication that auto-configuration device 210 was ordered by the customer.

As further shown in FIG. 4, process 400 may include generating a digital voucher, associated with the customer and the auto-configuration device, to be used for validation during an automatic device configuration process (block 450), and providing the digital voucher to a device associated with the customer (block 460). For example, provider device 260 may generate and/or receive a digital voucher based on the order information. The digital voucher may be, for example, a digital certificate signed using the provider public key. For example, the digital voucher may include the customer identifier and a device identifier, and may be signed using the provider private key. Provider device 260 may provide the digital voucher to customer device 240.

The device identifier included in the digital voucher may identify an auto-configuration device 210 that was ordered by the customer. The device identifier may include, for example, a serial number of the device, an initial device identifier that identifies the device (e.g., an IDevID, according to the Institute of Electrical and Electronics Engineers (IEEE) 802.11ar standard), a media access control (MAC) address of the device, or the like. In some implementations, the customer may order multiple auto-configuration devices 210, each of which may be associated with a different device identifier. In this case, each device identifier may correspond to a respective auto-configuration device 210.

In some implementations, a provider may provide input, associated with the customer's order, to provider device 260, and provider device 260 may generate the digital voucher based on the input. In some implementations, there may be a time delay between when the order information is received and when the digital voucher is generated. For example, the digital voucher may be generated as part of a process of preparing to ship auto-configuration device 210 to a customer.

In some implementations, a customer may order multiple auto-configuration devices 210. In this case, provider device 260 may generate separate digital vouchers corresponding to each auto-configuration device 210. Each digital voucher may include the customer identifier and a device identifier for the auto-configuration device 210 to which the digital voucher corresponds.

Additionally, or alternatively, provider device 260 may generate a digital voucher for multiple auto-configuration devices 210. In this case, the digital voucher may include a customer identifier and multiple device identifiers that correspond to the multiple auto-configuration devices. For example, provider device 260 may provide a digital voucher for multiple auto-configuration devices 210 when the multiple auto-configuration devices 210 are to have the same configuration. In this case, when performing an automatic device configuration process, auto-configuration device 210 may verify that the device identifier of auto-configuration device 210 is included in the digital voucher (e.g., and is not necessarily the only device identifier included in the digital voucher).

Auto-configuration device 210 may use the digital voucher during an automatic device configuration process, as described in more detail elsewhere herein. For example, auto-configuration device 210 may use the digital voucher to determine a customer identifier associated with auto-configuration device 210, to improve security of the automatic device configuration process, and/or to reduce errors in the automatic device configuration process.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
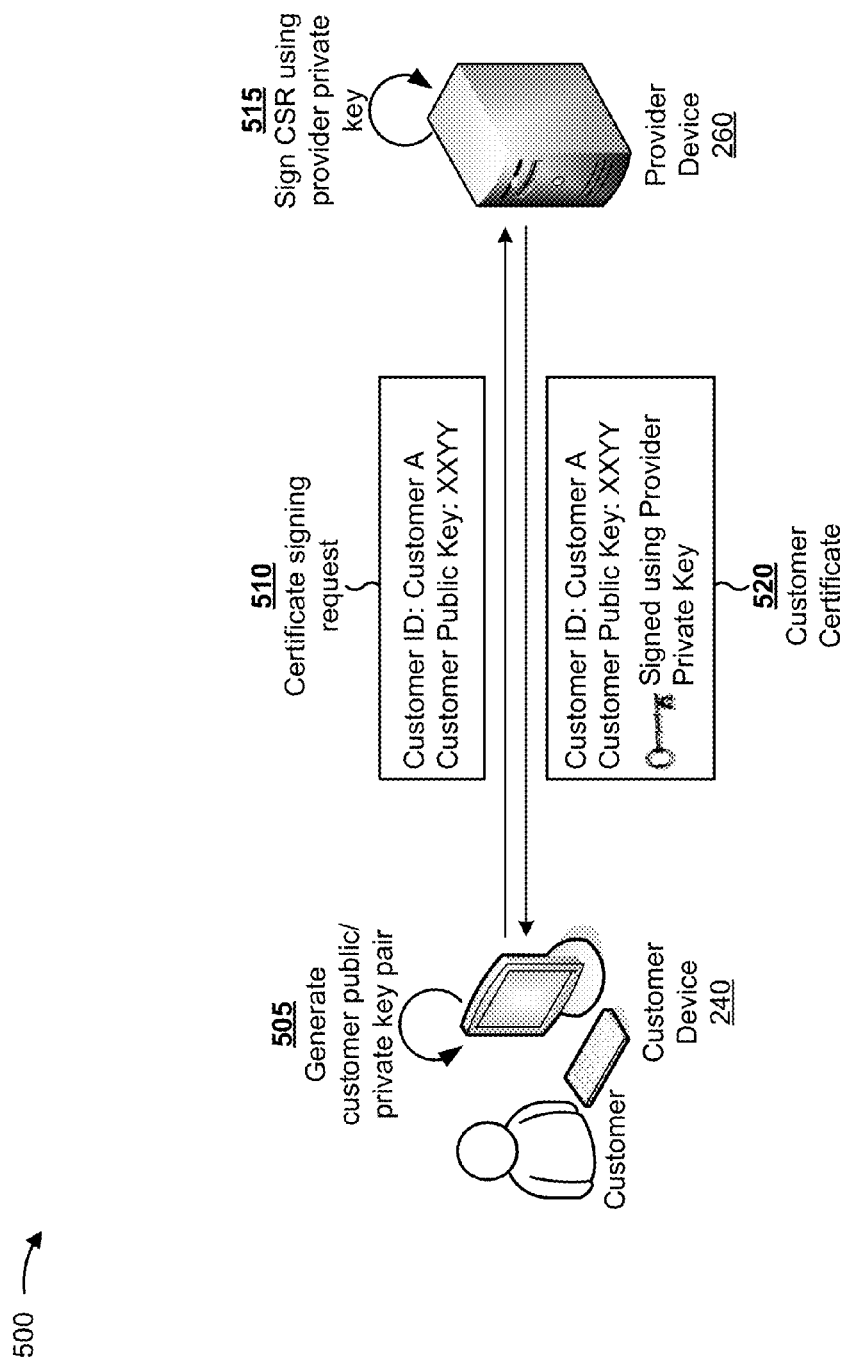

FIGS. 5A and 5B are diagrams of an example implementation 500 relating to example process 400 shown in FIG. 4. FIGS. 5A and 5B show an example of generating a customer certificate and a digital voucher to be used for validation during an automatic device configuration process.

As shown in FIG. 5A, and by reference number 505, assume that a customer interacts with customer device 240 to cause customer device 210 to generate and/or obtain a public/private key pair, which includes a customer public key and a customer private key. As shown by reference number 510, assume that the customer interacts with customer device 240 to cause customer device 240 to provide a certificate signing request to provider device 260. As shown, assume that the certificate signing request includes a customer identifier (e.g., a customer ID, shown as "Customer A"), and the customer public key (e.g., shown, for simplicity, as "XXYY").

As shown by reference number 515, assume that provider device 260 receives the certificate signing request and signs the certificate signing request using a provider private key (e.g., previously obtained and/or generated by provider device 260). As shown by reference number 520, the signed certificate signing request may be referred to as a customer certificate, and provider device 260 may provide the customer certificate to customer device 240. As shown, assume that the customer certificate includes the customer identifier and the customer public key, and is signed using the provider public key.

As shown in FIG. 5B, and by reference number 525, assume that the customer interacts with customer device 240 to order (e.g., purchase) an auto-configuration device 210. For example, the customer may order the auto-configuration device 210 via a website that offers auto-configuration devices 210 for sale. As shown by reference number 530, based on the customer order, assume that customer device 240 (or a device associated with the website from which auto-configuration device 210 was purchased) provides order information to provider device 260. As shown, assume that the order information includes a customer identifier, that identifies the customer, and an indication that the customer ordered auto-configuration device 210.

As shown by reference number 535, assume that provider device 210 determines additional order information associated with the order. For example, assume that provider device 260 uses the customer identifier to identify (e.g., access using a data structure, request from another device, etc.) a device identifier that identifies auto-configuration device 210 purchased by the customer (e.g., a device ID, shown as "1234"). For example, auto-configuration device 210 may be shipped to the customer, and the device identifier may identify the auto-configuration device 210 shipped to the customer. Using the customer identifier and the device identifier, provider device 260 may generate a digital voucher associated with the customer and the auto-configuration device 210 purchased by the customer, and may sign the digital voucher using the provider private key. In some implementations, there may be a time delay between when the customer orders auto-configuration device 210 and when the digital voucher is generated.

As shown by reference number 540, provider device 260 may provide the digital voucher to customer device 240. As shown, the digital voucher may include the customer identifier and the device identifier, and may be signed using the provider private key. Auto-configuration device 210 may use the digital voucher and/or other information to securely perform an automatic device configuration process, as described in more detail elsewhere herein.

As indicated above, FIGS. 5A and 5B are provided merely as an example. Other examples are possible and may differ from what was described with regard to FIGS. 5A and 5B.

Figure 6:
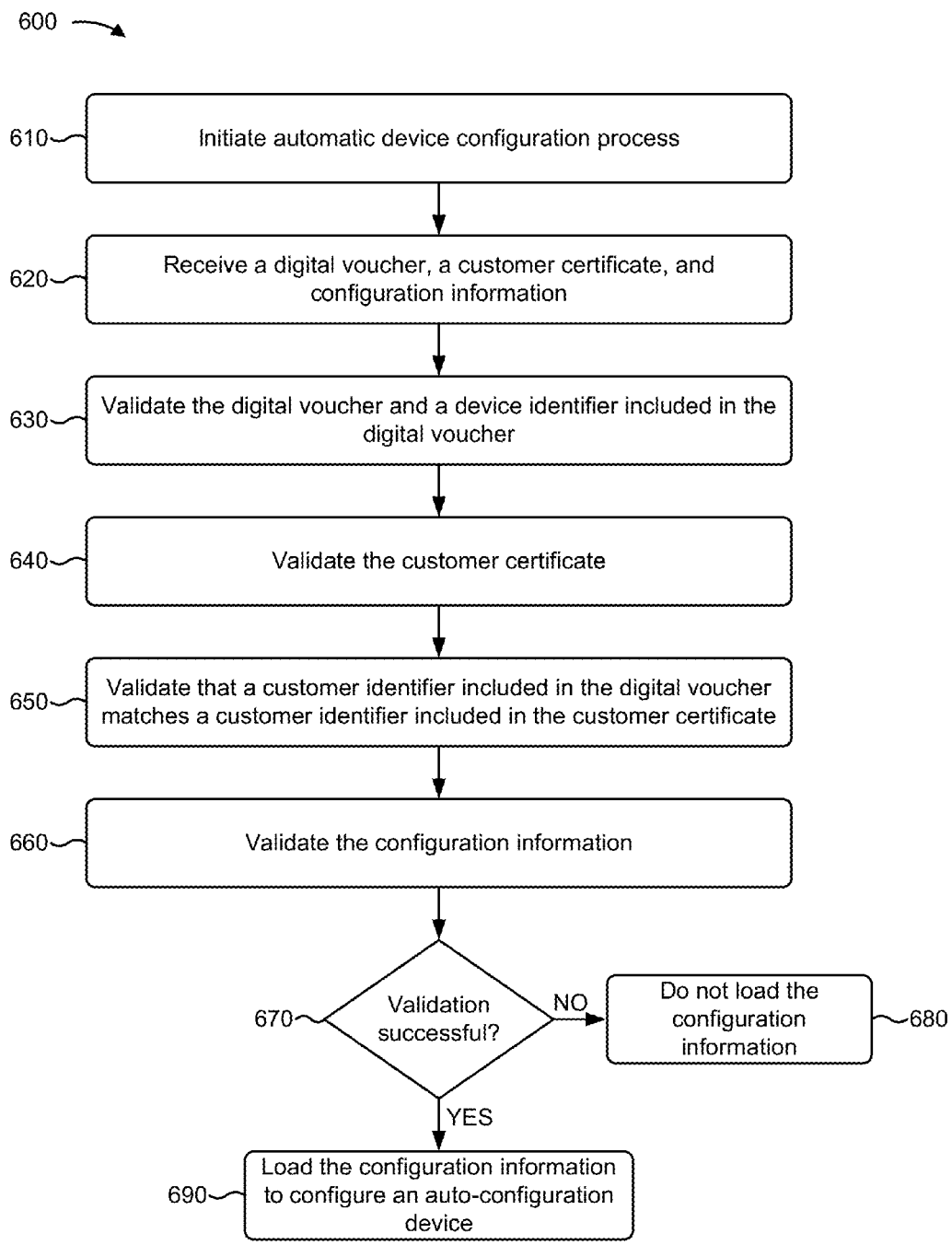
FIG. 6 is a flow chart of an example process for performing an automatic device configuration process to configure a device.

FIG. 6 is a flow chart of an example process 600 for performing an automatic device configuration process to configure a device. In some implementations, one or more process blocks of FIG. 6 may be performed by auto-configuration device 210.

As shown in FIG. 6, process 600 may include initiating an automatic device configuration process (block 610). For example, auto-configuration device 210 may initiate an automatic device configuration process upon being connected to a network (e.g., at startup of auto-configuration device 210). For example, a customer may connect auto-configuration device 210 to a network. Auto-configuration device 210 may determine a current configuration, and may initiate the automatic device configuration process based on the current configuration. For example, if the current configuration of auto-configuration device 210 is a factory configuration (e.g., an original configuration installed by a provider and/or unaltered by a customer), then auto-configuration device 210 may initiate the automatic device configuration process. This may ensure that auto-configuration device 210 does not re-configure itself after being configured by a customer and/or an automatic device configuration process (e.g., auto-configuration device 210 may only need to perform the automatic device configuration process once).

In some implementations, auto-configuration device 210 may be configured using the factory configuration when auto-configuration device 210 is shipped by the provider, when auto-configuration device 210 is received by the customer, when auto-configuration device 210 is reset to the factory configuration (e.g., by the customer, by the provider, etc.) after being configured with another configuration, or the like.

As further shown in FIG. 6, process 600 may include receiving a digital voucher, a customer certificate, and configuration information (block 620). For example, auto-configuration device 210 may receive a digital voucher, a customer certificate, and configuration information. The digital voucher and the customer certificate may be generated as described elsewhere herein. The configuration information may include information for automatically configuring auto-configuration device 210 with a particular configuration. In some implementations, the configuration information may be signed using the customer private key.

In some implementations, auto-configuration device 210 may receive (e.g., may obtain) the digital voucher, the customer certificate, and/or the configuration information from configuration storage device 220. For example, a customer may interact with customer device 240 to cause customer device 240 to provide the digital voucher (e.g., received from provider device 260), the customer certificate (e.g., received from provider device 260), and the configuration information (e.g., input by a user of customer device 240 and/or received from another device) to configuration storage device 220. In some implementations, the digital voucher, the customer certificate, and/or the configuration information may be referred to as staging information, and may be used to stage configuration storage device 220 to assist with auto-configuration of auto-configuration device 210. For example, auto-configuration device 210 may request the staging information from configuration storage device 220 (e.g., after customer device 240 provides the staging information to configuration storage device 220), and may receive the staging information from configuration storage device 220.

Additionally, or alternatively, the staging information may include one or more certificate revocation lists. A certificate revocation list may include information that identifies one or more certificates that have been revoked, thereby indicating that entities presenting those certificate(s) are not to be trusted. When performing validation prior to auto-configuration, auto-configuration device 210 may determine whether a certificate (e.g., associated with a provider public key, a customer public key, etc.) is identified in a certificate revocation list. If a certificate is identified in a certificate revocation list, auto-configuration device 210 may fail to validate, and may not perform auto-configuration.

Additionally, or alternatively, the staging information may include a provider public key used by auto-configuration device 210 to validate information signed using a provider private key. In some implementations, provider device 260 may provide the provider public key to a device associated with the customer (e.g., configuration storage device 220, network management system 230, etc.). In some implementations, different staging information may be stored by different devices. For example, the digital voucher, the customer certificate, and the configuration information may be stored by configuration storage device 220, and the provider public key may be stored by network management system 230.

In some implementations, the customer may provide input to customer device 240 to cause customer device 240 to provide a network address list to network management system 230, dynamic network assignment server 270, or a similar type of device. The network address list may identify one or more network addresses (e.g., a uniform resource identifier (URI), a uniform resource locator (URL), an Internet Protocol (IP) address, etc.) of device(s) where staging information is stored. For example, the network address list may identify a URL associated with configuration storage device 220. Upon startup, auto-configuration device 210 may receive (e.g., may obtain) the network address list, may use the network address list to identify configuration storage device 220 and/or another device where staging information is stored, and may use the network address of configuration storage device 220 and/or the other device to request the staging information from configuration storage device 220 and/or the other device.

As further shown in FIG. 6, process 600 may include validating the digital voucher and a device identifier included in the digital voucher (block 630). For example, auto-configuration device 210 may validate the digital voucher (e.g., received from configuration storage device 220), and may validate a device identifier included in the digital voucher. In some implementations, auto-configuration device 210 may validate the digital voucher by validating a digital signature attached to the digital voucher. For example, the digital voucher may be signed using a provider private key, and auto-configuration device 210 may validate the digital voucher using a provider public key. In some implementations, auto-configuration device 210 may receive the provider public key upon startup (e.g., from network management system 230, from configuration storage device 220, etc.). Additionally, or alternatively, auto-configuration device 210 may be hard-coded with the provider public key (e.g., as a trust anchor).

After successfully validating the digital voucher, auto-configuration device 210 may identify a device identifier included in the digital voucher, and may validate the device identifier. Auto-configuration device 210 may validate the device identifier by comparing the device identifier, included in the digital voucher, to a device identifier stored by auto-configuration device 210 (e.g., hard-coded in auto-configuration device 210). If the first device identifier (included in the digital voucher) matches the second device identifier (stored by auto-configuration device 210), then auto-configuration device 210 may successfully validate the device identifier.

In some implementations, the digital voucher may include a list of device identifiers (e.g., multiple device identifiers). In this case, auto-configuration device 210 may validate the digital voucher by determining whether the stored device identifier, stored by auto-configuration device 210 is included in the list of device identifiers included in the digital voucher. If the stored device identifier matches a device identifier included in the list, then auto-configuration device 210 may successfully validate the device identifier.

After successfully validating the device identifier included in the digital voucher, auto-configuration device 210 may identify a customer identifier included in the digital voucher. Auto-configuration device 210 may use the customer identifier, included in the digital voucher, to validate a customer identifier included in the customer certificate, as described below.

As further shown in FIG. 6, process 600 may include validating the customer certificate (block 640), and validating that a customer identifier included in the digital voucher matches a customer identifier included in the customer certificate (block 650). For example, auto-configuration device 210 may validate the customer certificate (e.g., received from configuration storage device 220), and may validate a customer identifier included in the customer certificate. In some implementations, auto-configuration device 210 may validate the customer certificate by validating a digital signature attached to the customer certificate (e.g., a digital signature attached to the customer certificate). For example, the customer certificate may be signed using a provider private key, and auto-configuration device 210 may validate the customer certificate using a provider public key.

After successfully validating the customer certificate, auto-configuration device 210 may identify a customer identifier included in the customer certificate, and may validate the customer identifier. Auto-configuration device 210 may validate the customer identifier by comparing the customer identifier, included in the customer certificate, to a customer identifier included in the digital voucher (e.g., obtained as described above). If the first device identifier (included in the customer certificate) matches the second device identifier (included in the digital voucher), then auto-configuration device 210 may successfully validate the customer identifier.

After successfully validating the customer identifier included in the customer certificate, auto-configuration device 210 may identify a customer public key included in the customer certificate. Auto-configuration device 210 may use the customer public key, included in the customer certificate, to validate the configuration information, as described below.

As further shown in FIG. 6, process 600 may include validating the configuration information (block 660). For example, auto-configuration device 210 may validate the configuration information (e.g., received from configuration storage device 220). In some implementations, auto-configuration device 210 may validate the configuration information by validating a digital signature attached to the configuration information (e.g., attached to the configuration information). For example, the configuration information may be signed using a customer private key, and auto-configuration device 210 may validate the configuration information using a customer public key. The customer public key may be obtained from the customer certificate, as described above.

As further shown in FIG. 6, process 600 may include determining whether the validation is successful (block 670). For example, auto-configuration device 210 may determine whether validation is successful. As described above, validation may include a set of validations, such as validating the digital voucher, validating the device identifier included in the digital voucher, validating the customer certificate, validating the customer identifier included in the customer certificate, and/or validating the configuration information. If any of the set of validations fail, then auto-configuration device 210 may not load the configuration information, as described below. If all of the set of validations succeed, then auto-configuration device 210 may load the configuration information, as described below.

As further shown in FIG. 6, if the validation is not successful (block 670—NO), process 600 may include not loading the configuration information (block 680). For example, if auto-configuration device 210 fails to successfully perform any of the set of validations described above (e.g., in connection with one or more of blocks 630-670), then auto-configuration device 210 may prevent auto-configuration device 210 from being configured using a configuration identified in the configuration information. Furthermore, if a particular validation fails, auto-configuration device 210 may not proceed to a next validation. For example, if auto-configuration device 210 fails to validate the digital voucher, then auto-configuration device 210 may not perform validation of a device identifier included in the digital voucher. In this way, auto-configuration device 210 may ensure that a configuration is valid and secure before performing auto-configuration. This may prevent auto-configuration device 210 from being configured with a malicious configuration, an incorrect configuration, an erroneous configuration, or the like.

As further shown in FIG. 6, if the validation is successful (block 670—YES), process 600 may include loading the configuration information to configure an auto-configuration device (block 690). For example, if auto-configuration device 210 successfully performs the set of validations described above (e.g., in connection with one or more of blocks 630-670), then auto-configuration device 210 may configure itself using a configuration identified in the configuration information. In this way, auto-configuration device 210 may automatically configure itself using a customer configuration after ensuring that the customer configuration is valid (e.g., is approved by the customer, is trusted by the provider, is intended for auto-configuration device 210, etc.).

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

FIGS. 7A-7F are diagrams of an example implementation 700 relating to example process 600 shown in FIG. 6. FIGS. 7A-7F show an example of performing an automatic device configuration process to configure auto-configuration device 210. For the purpose of FIGS. 7A-7F, assume that the operations described herein in connection with FIGS. 5A and 5B have been performed.

Figure 7A:
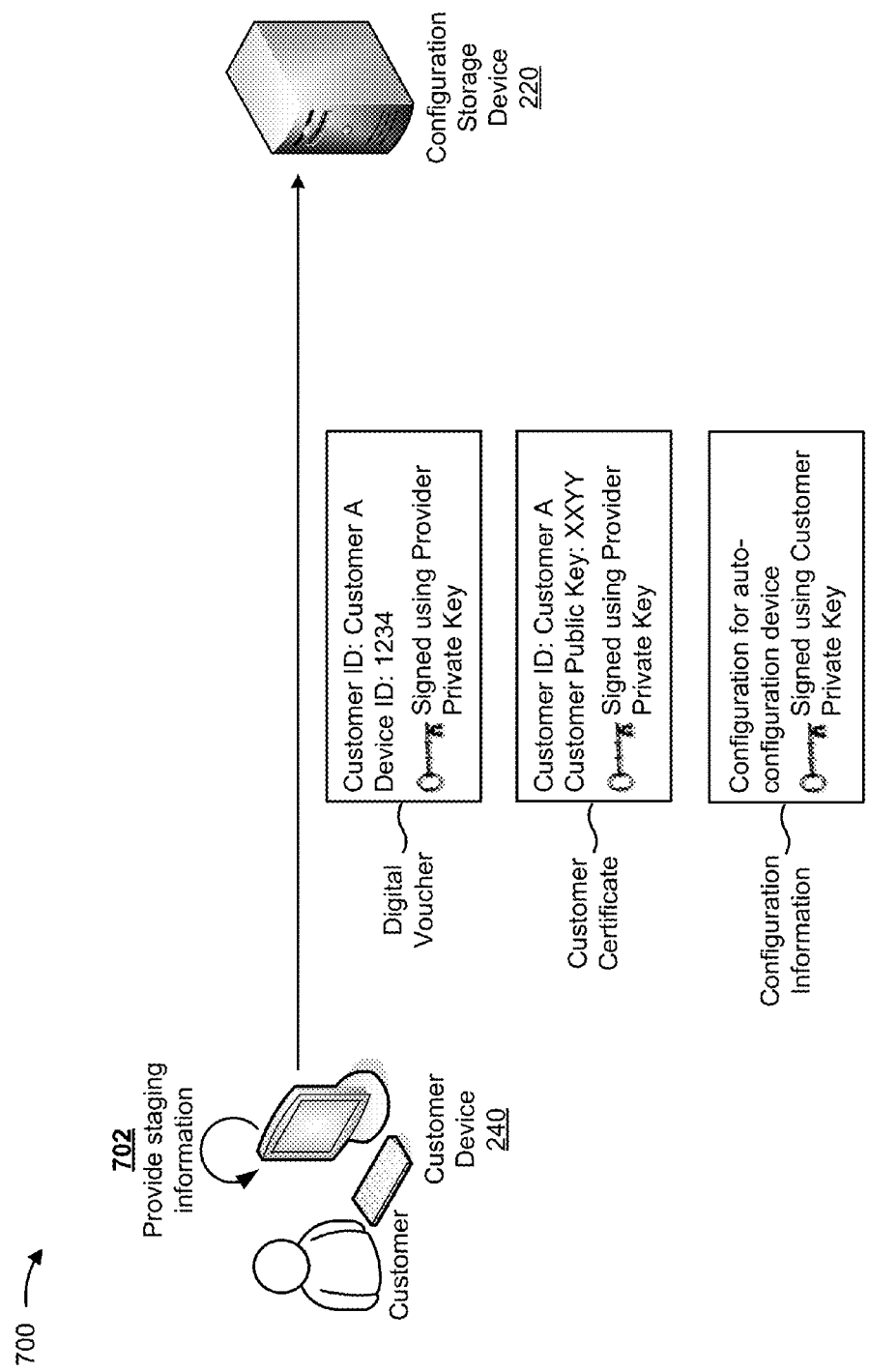
FIGS. 7A-7F are diagrams of an example implementation relating to the example process shown in FIG. 6.

As shown in FIG. 7A, and by reference number 702, assume that a customer interacts with customer device 240 to cause customer device 240 to provide staging information to configuration storage device 220. As shown, assume that the staging information includes a digital voucher, described above in connection with FIG. 5B, and a customer certificate, described above in connection with FIG. 5A. As further shown, assume that the staging information includes configuration information. For example, assume that the customer inputs, to customer device 240, information that identifies a configuration for auto-configuration device 210. Furthermore, assume that the customer signs the information that identifies the configuration, using the customer private key, to generate the configuration information. Assume that customer device 240 provides the digital voucher, the customer certificate, and the configuration information to configuration storage device 220.

Figure 7B:
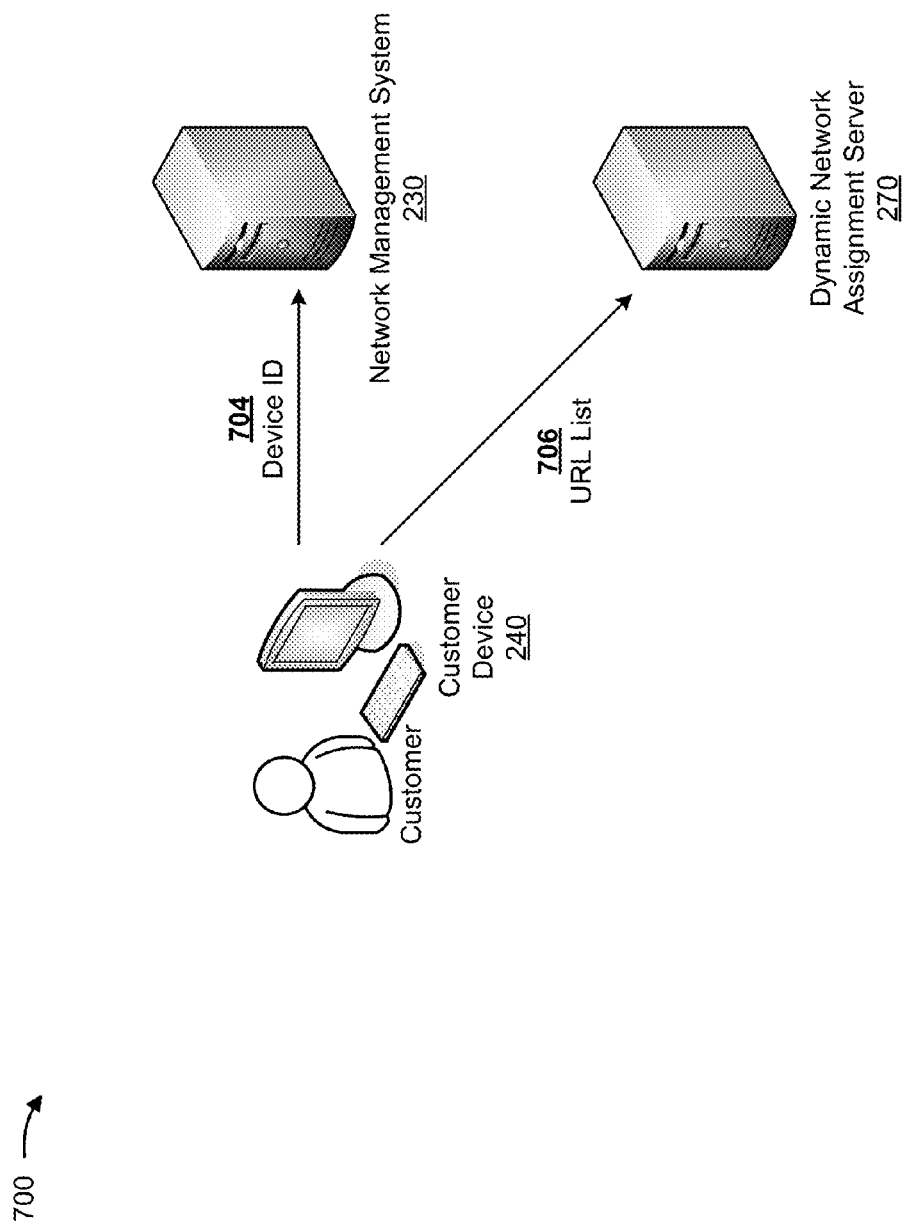

As shown in FIG. 7B, and by reference number 704, assume that the customer interacts with customer device 240 to cause customer device 240 to provide, to network management system 230, a device identifier that identifies auto-configuration device 210. Network management system 230 may use the device identifier to validate auto-configuration device 210 (e.g., during and/or after an automatic device configuration process used by auto-configuration device 210 to discover network management system 230. As shown by reference number 706, assume that customer device 240 provides, to dynamic network assignment server 270, a URL list that identifies configuration storage device 220 as storing staging information. Dynamic network assignment server 270 may use the URL list to assist auto-configuration device 210 with performing an automatic device configuration process, as described below.

Figure 7C:
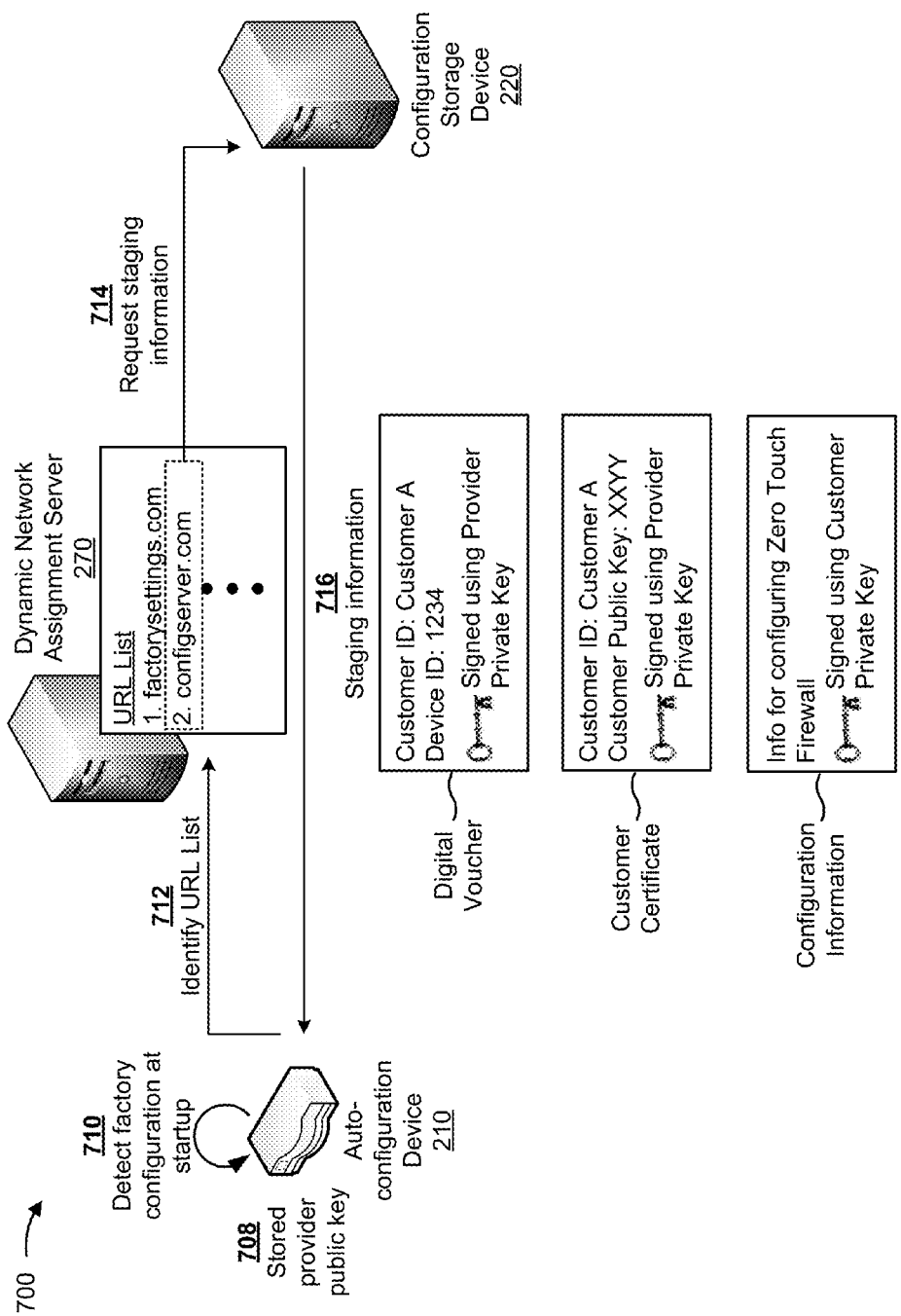

As shown in FIG. 7C, assume that auto-configuration device 210 has been shipped to and received by the customer, and that the customer connects auto-configuration device 210 to a network (e.g., customer network 250). As shown by reference number 708, assume that auto-configuration device 210 stores a provider public key, which may be hard-coded in memory of auto-configuration device 210. As shown by reference number 710, assume that auto-configuration device 210 detects a factory configuration at startup. As shown by reference number 712, based on detecting the factory configuration, assume that auto-configuration device 210 identifies a URL list that identifies configuration storage device 220 that stores staging information. For example, auto-configuration device 210 may retrieve the URL list from dynamic network assignment server 270. As shown by reference number 714, assume that auto-configuration device 210 requests the staging information from configuration storage device 220. As shown by reference number 716, assume that configuration storage device 220 provides the staging information to auto-configuration device 210. As shown, the staging information includes the digital voucher, the customer certificate, and the configuration information.

Figure 7D:
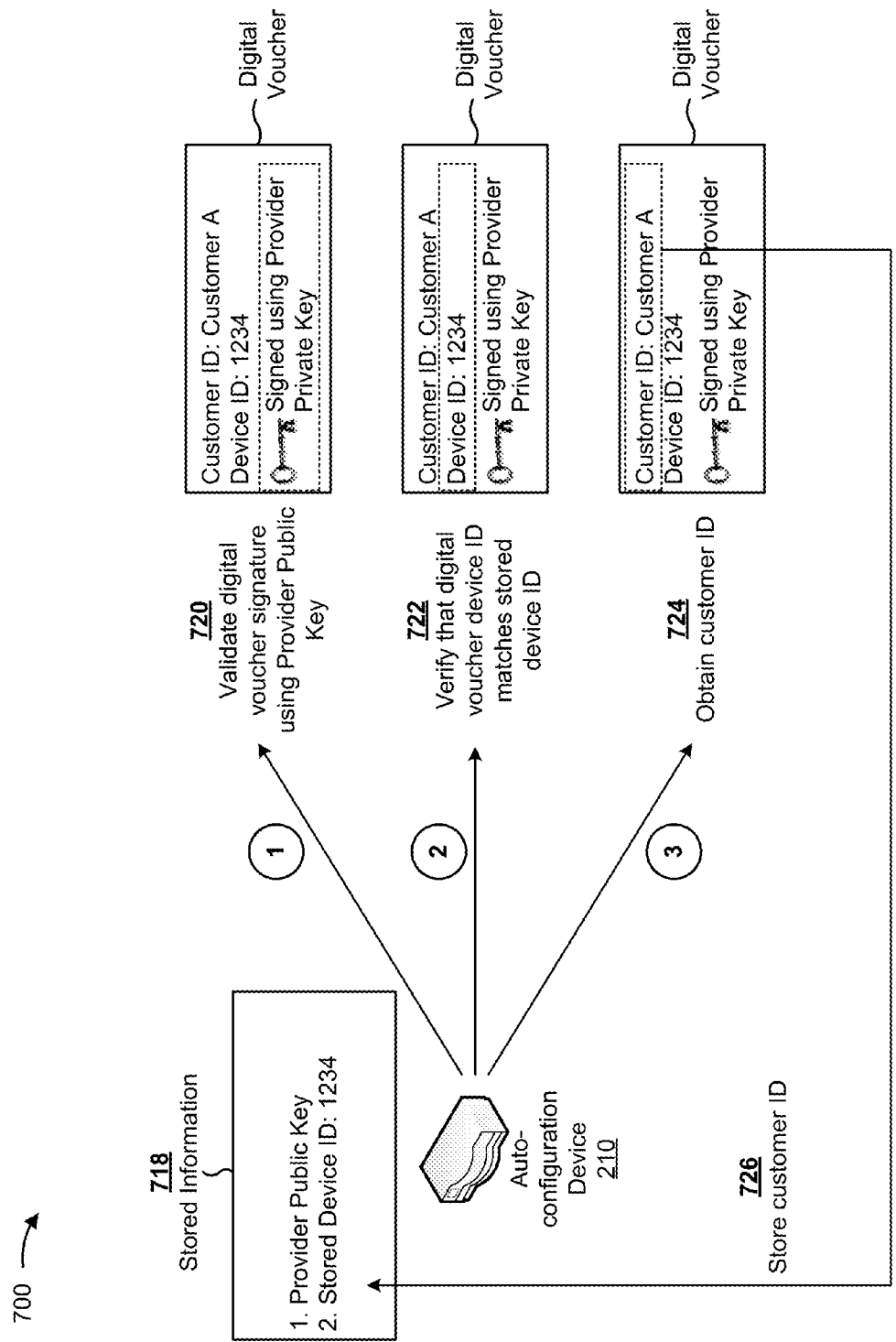

As shown in FIG. 7D, and by reference number 718, assume that auto-configuration device 210 stores a provider public key (e.g., hard-coded in memory of auto-configuration device 210) and a device identifier (e.g., hard-coded in auto-configuration device 210). Auto-configuration device 210 may use this information to validate the digital voucher. For example, as shown by reference number 720, auto-configuration device 210 validates the digital voucher by using the provider public key to validate a digital signature of the digital voucher. As shown by reference number 722, auto-configuration device 210 verifies that a device identifier, included in the digital voucher (e.g., a device ID of "1234") matches a device identifier stored by auto-configuration device 210 (e.g., a device ID of "1234"). As shown by reference number 724, upon successful validation, auto-configuration device 210 obtains a customer identifier included in the digital voucher. As shown by reference number 726, auto-configuration device 210 stores the customer identifier.

Figure 7E:
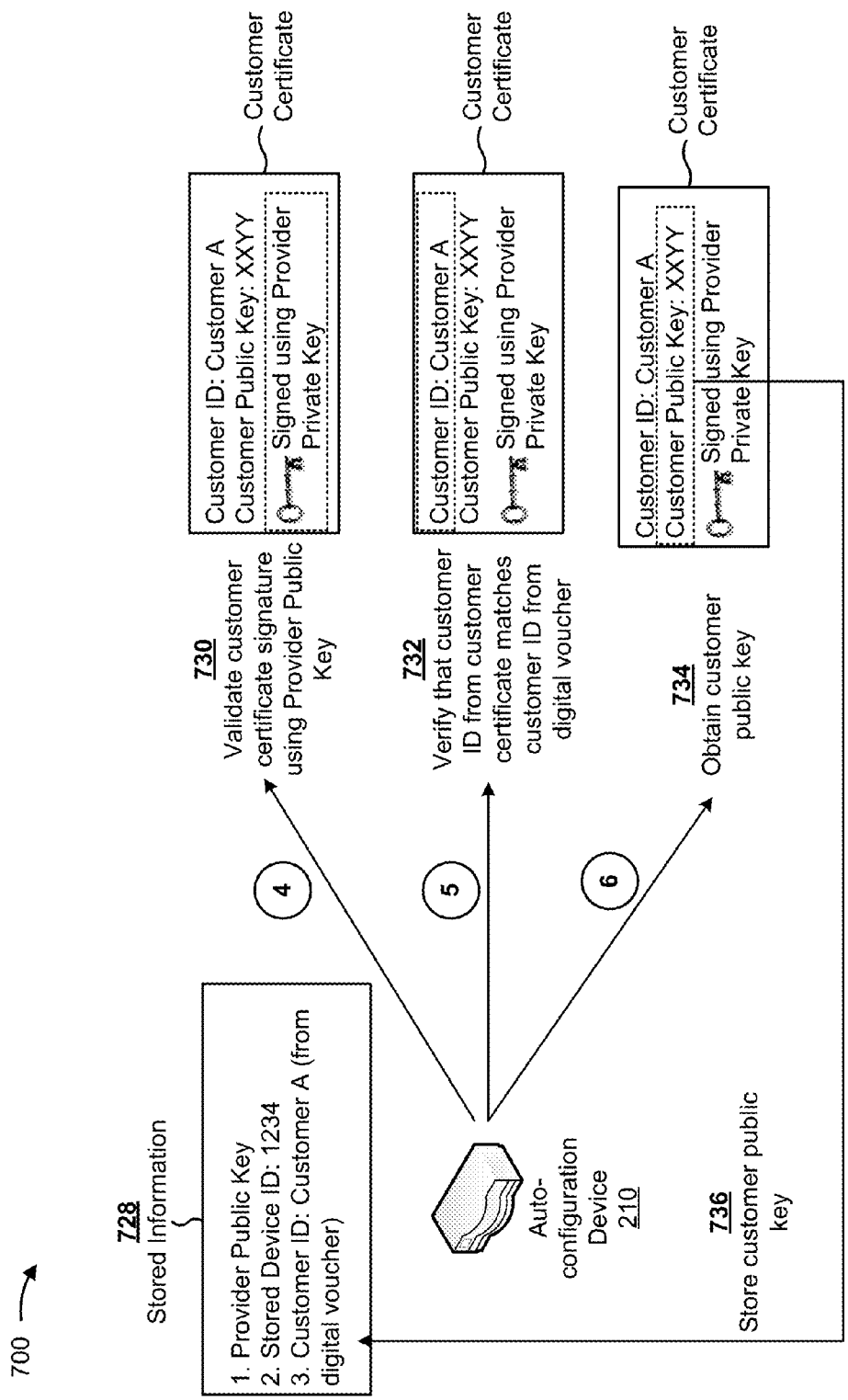

As shown in FIG. 7E, and by reference number 728, the information stored by auto-configuration device 210 now includes the customer identifier from the digital voucher (e.g., a customer ID of "Customer A"). Auto-configuration device 210 may use this information to validate the customer certificate. As shown by reference number 730, auto-configuration device 210 validates the customer certificate by using the provider public key to validate a digital signature of the customer certificate. As shown by reference number 732, auto-configuration device 210 verifies that a customer identifier, included in the customer certificate (e.g., a customer ID of "Customer A") matches a customer identifier stored by auto-configuration device 210 and obtained from the digital voucher (e.g., a customer ID of "Customer A"). As shown by reference number 734, upon successful validation, auto-configuration device 210 obtains a customer public key included in the customer certificate. As shown by reference number 736, auto-configuration device 210 stores the customer public key.

Figure 7F:
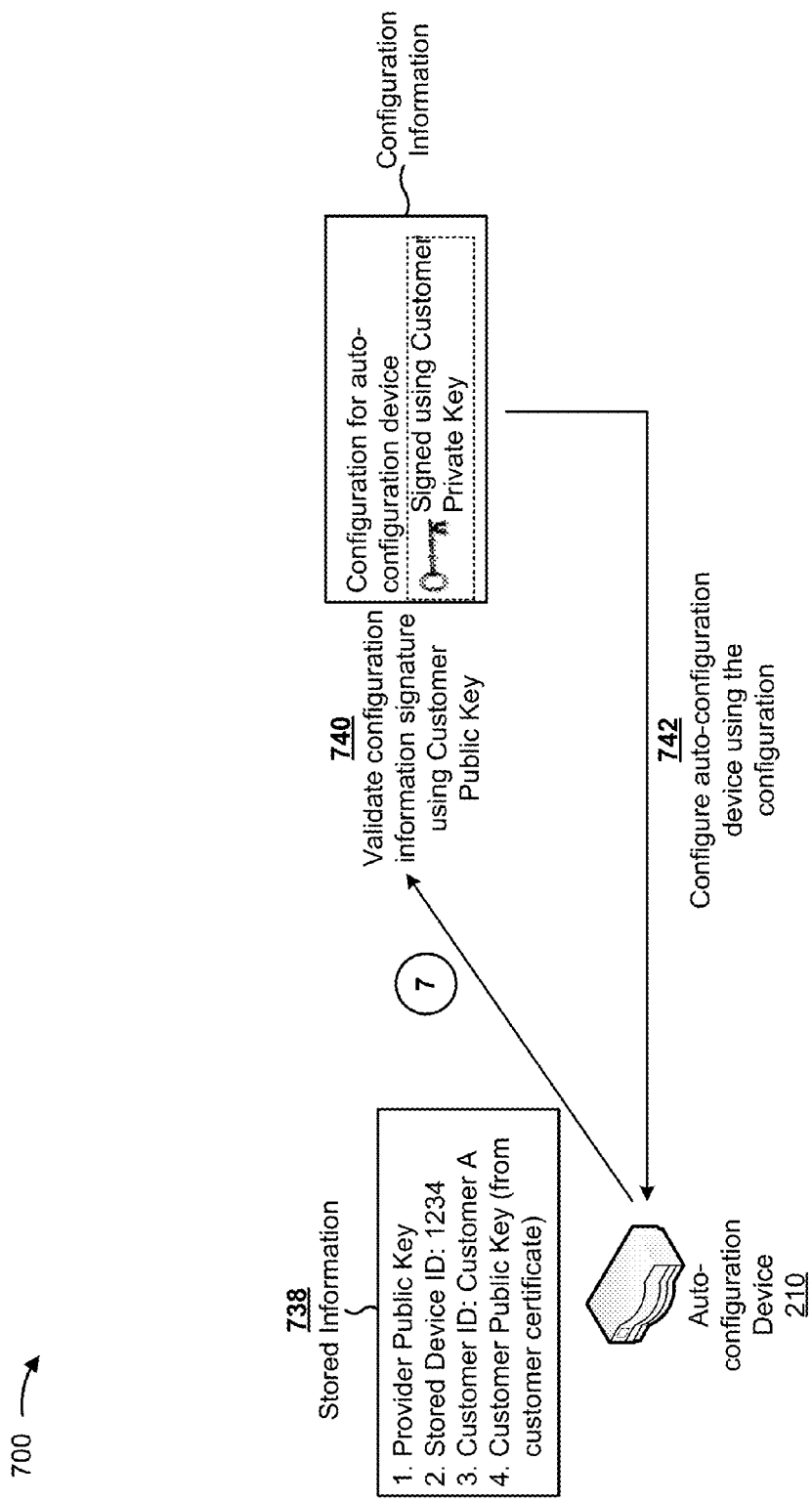

As shown in FIG. 7F, and by reference number 738, the information stored by auto-configuration device 210 now includes the customer public key from the customer certificate. Auto-configuration device 210 may use the customer public key to validate the configuration information. For example, as shown by reference number 740, auto-configuration device 210 validates the configuration information by using the customer public key to validate a digital signature of the configuration information. As shown by reference number 742, upon successful validation, auto-configuration device 210 obtains the configuration from the configuration information, and automatically configures itself based on the configuration. For example, auto-configuration device 210 may configure itself by storing particular configuration information, modifying one or more configuration settings (e.g., a software setting, a hardware setting, a firmware setting, etc.), communicating with one or more other devices (e.g., to assist with configuration, to establish a connection, etc.), restarting to initialize a configuration, or the like. In this way, auto-configuration device 210 may automatically configure itself in a secure manner.

As indicated above, FIGS. 7A-7F are provided merely as an example. Other examples are possible and may differ from what was described with regard to FIGS. 7A-7F.

Implementations described herein permit an auto-configuration device to automatically configure itself via an automatic device configuration process (e.g., a "zero touch" configuration process). Furthermore, implementations described herein provide such automatic configuration in a secure manner to prevent the auto-configuration device from being maliciously or incorrectly configured.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "group" and "set" are intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors at least partially implemented in hardware to:
initiate an automatic device configuration process to automatically configure the device;
receive, based on initiating the automatic device configuration process, a digital voucher, a customer certificate, and configuration information,
the digital voucher including:
a first customer identifier that identifies a customer associated with the device, and
a device identifier that identifies the device,
the customer certificate including:
a second customer identifier that identifies the customer, and
a customer public key associated with the customer, and
the configuration information including information that identifies a configuration for automatically configuring the device;
validate at least one of the digital voucher, the customer certificate, or the configuration information;

validate the first customer identifier based on determining that the first customer identifier matches the second customer identifier; and configure the device, using the configuration, based on validating the first customer identifier and at least one of the digital voucher, the customer certificate, or the configuration information.

2. The device of claim 1, where the one or more processors are further to:

verify that the device identifier, included in the digital voucher, matches a stored device identifier stored by the device; and where the one or more processors, when configuring the device, are to:

configure the device based on verifying that the device identifier matches the stored device identifier.

3. The device of claim 1, where the one or more processors, when validating at least one of the digital voucher, the customer certificate, or the configuration information, are to:

validate a digital signature, associated with the customer certificate, using a provider public key that is different from the customer public key; and where the one or more processors, when configuring the device, are to:

configure the device based on validating the digital signature.

4. The device of claim 1, where the one or more processors, when validating at least one of the digital voucher, the customer certificate, or the configuration information, are to:

validate a digital signature, associated with the configuration information, using the customer public key included in the customer certificate; and where the one or more processors, when configuring the device, are to:

configure the device based on validating the digital signature associated with the configuration information.

5. The device of claim 1, where the one or more processors are further to:

determine that the device is configured with a factory configuration; and where the one or more processors, when initiating the automatic device configuration process, are to:

initiate the automatic device configuration process based on determining that the device is configured with the factory configuration.

6. The device of claim 1, where the configuration information is digitally signed using a customer private key that corresponds to the customer public key included in the customer certificate.

7. The device of claim 1, where the digital voucher is digitally signed using a provider private key that corresponds to a provider public key that is different from the customer public key included in the customer certificate; and where the customer certificate is digitally signed using the provider private key.

8. A non-transitory computer-readable medium storing instructions, the instructions comprising:

one or more instructions that, when executed by one or more processors, at least partially implemented in hardware, of a device, cause the one or more processors to:

receive a digital voucher, a customer certificate, and configuration information for automatically configuring the device, the digital voucher including:

a first customer identifier that identifies a customer associated with the device, and a device identifier that identifies the device, the customer certificate including:

a second customer identifier that identifies the customer, and a customer public key associated with the customer, and the configuration information including information that identifies a configuration for automatically configuring the device;

validate at least one of the digital voucher, the customer certificate, or the configuration information;

validate the first customer identifier based on determining that the first customer identifier matches the second customer identifier; and configure the device, using the configuration, based on validating the first customer identifier and at least one of the digital voucher, the customer certificate, or the configuration information.

9. The non-transitory computer-readable medium of claim 8, where the one or more instructions, when executed by the one or more processors, further cause the one or more processors to:

validate a digital signature, associated with the configuration information, using the customer public key included in the customer certificate; and where the one or more instructions, that cause the one or more processors to configure the device, cause the one or more processors to:

configure the device based on validating the digital signature associated with the configuration information.

10. The non-transitory computer-readable medium of claim 8, where the one or more instructions, when executed by the one or more processors, further cause the one or more processors to:

verify that the device identifier, included in the digital voucher, matches a stored device identifier stored by the device; and where the one or more instructions, that cause the one or more processors to configure the device, cause the one or more processors to:

configure the device based on verifying that the device identifier matches the stored device identifier.

11. The non-transitory computer-readable medium of claim 8, where the one or more instructions, that cause the one or more processors to validate at least one of the digital voucher, the customer certificate, or the configuration information, cause the one or more processors to:

validate a digital signature, associated with the customer certificate, using a provider public key that is different from the customer public key; and where the one or more instructions, that cause the one or more processors to configure the device, cause the one or more processors to:

configure the device based on validating the digital signature.

12. The non-transitory computer-readable medium of claim 8, where the one or more instructions, that cause the one or more processors to validate at least one of the digital voucher, the customer certificate, or the configuration information, cause the one or more processors to:

validate a digital signature, associated with the configuration information, using the customer public key included in the customer certificate; and where the one or more instructions, that cause the one or more processors to configure the device, cause the one or more processors to:
configure the device based on validating the digital signature associated with the configuration information.

13. The non-transitory computer-readable medium of claim 8, where the one or more instructions, when executed by the one or more processors, further cause the one or more processors to:
load the configuration, identified in the configuration information, to the device.

14. A method, comprising:
initiating, by a device, an automatic device configuration process to automatically configure the device;
receiving, by the device and based on initiating the automatic device configuration process, a digital voucher, a customer certificate, and configuration information,
the digital voucher including:
a first customer identifier that identifies a customer associated with the device, and
a device identifier that identifies the device,
the customer certificate including:
a second customer identifier that identifies the customer, and
a customer public key associated with the customer,
the configuration information including information that identifies a configuration for automatically configuring the device;
validating, by the device, at least one of the digital voucher, the customer certificate, or the configuration information;
validating, by the device, the first customer identifier based on determining that the first customer identifier matches the second customer identifier; and
configuring, by the device and based on validating the first customer identifier and at least one of the digital voucher, the customer certificate, or the configuration information, the device using the configuration.

15. The method of claim 14, where validating at least one of the digital voucher, the customer certificate, or the configuration information comprises:
verifying that the device identifier, included in the digital voucher, matches a stored device identifier stored by the device; and
validating a digital signature, associated with the configuration information, using the customer public key included in the customer certificate; and
where configuring the device comprises:
configuring the device based on at least one of:
verifying that the device identifier matches the stored device identifier,
or
validating the digital signature associated with the configuration information.

16. The method of claim 14, further comprising:
verifying that the device identifier, included in the digital voucher, matches a stored device identifier stored by the device; and
where configuring the device comprises:
configuring the device based on verifying that the device identifier matches the stored device identifier.

17. The method of claim 14, where validating at least one of the digital voucher, the customer certificate, or the configuration information comprises:
validating a digital signature, associated with the customer certificate, using a provider public key that is different from the customer public key; and
where configuring the device comprises:
configuring the device based on validating the digital signature.

18. The method of claim 14, where validating at least one of the digital voucher, the customer certificate, or the configuration information comprises:
validating a digital signature, associated with the configuration information, using the customer public key included in the customer certificate; and
where configuring the device comprises:
configuring the device based on validating the digital signature associated with the configuration information.

19. The method of claim 14, further comprising:
identifying one or more devices that store the digital voucher, the customer certificate, and the configuration information; and
requesting the digital voucher, the customer certificate, and the configuration information from the one or more devices; and
where receiving the digital voucher, the customer certificate, and the configuration information comprises:
receiving the digital voucher, the customer certificate, and the configuration information from the one or more devices.

20. The method of claim 14, further comprising:
detecting that the device is configured with a factory configuration; and
where initiating the automatic device configuration process comprises:
initiating the automatic device configuration process based on detecting that the device is configured with the factory configuration.

* * * * *